(12) United States Patent
Hein et al.

(10) Patent No.: US 11,248,273 B2
(45) Date of Patent: Feb. 15, 2022

(54) HIDE CUSTOMIZATION SYSTEMS AND METHODS

(71) Applicant: National Beef Packing Company, LLC, Kansas City, MO (US)

(72) Inventors: Robert Horst Hein, Kansas City, MO (US); Kenneth Graham Press, Kansas City, MO (US)

(73) Assignee: National Beef Packing Company, LLC, Kansas City, MO (US)

( * ) Notice: Subject to any disclaimer, the term of this patent is extended or adjusted under 35 U.S.C. 154(b) by 0 days.

(21) Appl. No.: 16/687,657

(22) Filed: Nov. 18, 2019

(65) Prior Publication Data

US 2020/0080162 A1 Mar. 12, 2020

Related U.S. Application Data

(63) Continuation of application No. 14/724,643, filed on May 28, 2015, now Pat. No. 10,480,040.

(Continued)

(51) Int. Cl.
*G06Q 30/06* (2012.01)
*C14B 17/00* (2006.01)
(Continued)

(52) U.S. Cl.
CPC .............. *C14B 17/005* (2013.01); *B07C 5/16* (2013.01); *B07C 5/34* (2013.01); *B07C 5/38* (2013.01);
(Continued)

(58) Field of Classification Search
CPC ......... C14B 17/005; C14B 1/14; B65G 57/00; B65G 57/02; C14C 3/00; C14C 3/06;
(Continued)

(56) References Cited

U.S. PATENT DOCUMENTS

| | | | |
|---|---|---|---|
| 5,659,740 A * | 8/1997 | Ezaki ...................... | G06Q 99/00 |
| 7,389,922 B2 * | 6/2008 | Yoshimura ........... | G06Q 10/087 |
| | | | 235/382 |

(Continued)

FOREIGN PATENT DOCUMENTS

| | | | | |
|---|---|---|---|---|
| EP | 1529850 A1 * | 5/2005 | ............ | C12M 21/04 |
| WO | WO-03038132 A1 * | 5/2003 | ............... | C14B 1/28 |

(Continued)

OTHER PUBLICATIONS

Dockery, A. (2005). A Custom Fit for the Leather 'Client'. Furniture Today, 3(4), 12-14. Retrieved from https://www.proquest.com/trade-journals/custom-fit-leather-client/docview/235530401/se-2?accountid=14753 (Year: 2005).*

(Continued)

*Primary Examiner* — Ashford S Hayles
(74) *Attorney, Agent, or Firm* — Seth Black; Black IP, PLLC

(57) ABSTRACT

Methods and systems for customizing hides are provided. In particular, one or more embodiments comprise a tanning control system that improves profitability and customer satisfaction by facilitating the customization of hides according to customer orders. Furthermore, one or more embodiments enable the tanning control system to improve efficiency and responsiveness by producing packages of hides that exactly match customer orders. Additionally, one or more embodiments enhance the traceability of hides by capturing data related to the customization of hides.

20 Claims, 8 Drawing Sheets

Related U.S. Application Data

(60) Provisional application No. 62/003,998, filed on May 28, 2014.

(51) Int. Cl.

| | | |
|---|---|---|
| *C14C 1/06* | (2006.01) | |
| *B07C 5/16* | (2006.01) | |
| *B07C 5/38* | (2006.01) | |
| *B07C 5/34* | (2006.01) | |
| *G05B 19/418* | (2006.01) | |
| *C14C 3/06* | (2006.01) | |
| *C14C 15/00* | (2006.01) | |
| *B65G 57/02* | (2006.01) | |
| *C14B 1/14* | (2006.01) | |
| *B65G 57/00* | (2006.01) | |
| *C14C 3/00* | (2006.01) | |

(52) U.S. Cl.
CPC ............ *B65G 57/00* (2013.01); *B65G 57/02* (2013.01); *C14B 1/14* (2013.01); *C14C 1/06* (2013.01); *C14C 3/00* (2013.01); *C14C 3/06* (2013.01); *C14C 15/00* (2013.01); *G05B 19/4189* (2013.01); *G06Q 30/0621* (2013.01); *G05B 2219/39106* (2013.01)

(58) Field of Classification Search
CPC ...... C14C 15/00; C14C 1/06; G06Q 30/0621; B07C 5/16; B07C 5/38; B07C 5/34; G05B 19/4189; G05B 2219/39106
See application file for complete search history.

(56) References Cited

U.S. PATENT DOCUMENTS

| | | | | |
|---|---|---|---|---|
| 7,885,857 B1* | 2/2011 | Fukuya | .................. | G06Q 10/06 705/26.5 |
| 8,091,390 B2* | 1/2012 | Houtz | ..................... | C14B 17/06 69/33 |
| 2002/0013719 A1* | 1/2002 | Shiiba | ................... | G06Q 30/06 700/100 |
| 2003/0033207 A1* | 2/2003 | Litke | ...................... | G06Q 30/06 705/26.5 |
| 2003/0069795 A1* | 4/2003 | Boyd | .................... | G06Q 20/203 705/22 |
| 2003/0097311 A1* | 5/2003 | Shinohara | ............ | G06Q 50/188 705/80 |
| 2003/0126043 A1* | 7/2003 | Chen | ..................... | G06Q 10/087 705/28 |
| 2003/0139840 A1* | 7/2003 | Magee | ................. | G06Q 30/06 700/133 |
| 2004/0158340 A1* | 8/2004 | Fischer | ................... | B29C 45/76 700/97 |
| 2004/0236445 A1* | 11/2004 | Bowles | .................. | G06Q 10/04 700/97 |
| 2005/0055255 A1* | 3/2005 | Soo | ................. | G06Q 10/06375 705/7.22 |
| 2006/0015207 A1* | 1/2006 | Weiser | .................. | G06Q 30/02 700/132 |
| 2006/0041465 A1* | 2/2006 | Woehler | .............. | G06Q 10/087 705/7.31 |
| 2006/0100934 A1* | 5/2006 | Burr | ................... | G06Q 30/0635 705/26.81 |
| 2006/0131382 A1* | 6/2006 | Thatcher | ................ | G06Q 30/02 235/376 |
| 2006/0190122 A1* | 8/2006 | Loeb | .................... | G06Q 10/087 700/132 |
| 2006/0190291 A1* | 8/2006 | Erickson | ............... | G06Q 20/203 705/28 |
| 2007/0219873 A1* | 9/2007 | Fischburg | .......... | G06Q 30/0603 705/26.81 |
| 2008/0077415 A1* | 3/2008 | Shannon | ........... | G06Q 30/0603 705/300 |
| 2008/0288373 A1* | 11/2008 | Gerber | ............... | G06Q 30/0621 705/29 |
| 2008/0299406 A1* | 12/2008 | Lee | ........................ | C14C 1/00 428/540 |
| 2009/0234749 A1* | 9/2009 | Fjellanger | .............. | G06Q 30/06 705/26.1 |
| 2009/0248477 A1* | 10/2009 | Bowles | ................. | G06Q 10/06 700/103 |
| 2009/0276291 A1* | 11/2009 | Wannier | ............. | G06Q 30/0603 705/14.66 |
| 2010/0065635 A1* | 3/2010 | Hedegaard | ............ | A01K 11/00 235/385 |
| 2010/0161366 A1* | 6/2010 | Clemens | ........... | G06Q 30/0201 705/7.29 |
| 2011/0282476 A1* | 11/2011 | Hegemier | .......... | G06Q 30/0621 700/100 |
| 2011/0313878 A1* | 12/2011 | Norman | ................ | G06Q 30/06 705/26.5 |
| 2012/0078405 A1* | 3/2012 | BenBassat | ............ | G06Q 10/06 700/100 |
| 2012/0123897 A1* | 5/2012 | Gargiulo | ............ | G06Q 30/0621 705/26.5 |
| 2012/0290119 A1* | 11/2012 | Gillette | .................. | G06Q 50/04 700/132 |
| 2013/0262260 A1* | 10/2013 | Giloh | ................. | G06Q 30/0603 705/26.5 |
| 2013/0268416 A1* | 10/2013 | Sandow | ............... | G06Q 10/087 705/28 |
| 2014/0095343 A1* | 4/2014 | Daniel | .............. | G06Q 30/0621 705/26.5 |
| 2015/0055085 A1* | 2/2015 | Fonte | .................... | H04N 5/23219 351/178 |
| 2015/0348154 A1* | 12/2015 | Hein | ...................... | B65G 57/00 705/26.5 |
| 2016/0069003 A1* | 3/2016 | Molnar | ................ | D03C 19/005 700/140 |
| 2016/0203430 A1* | 7/2016 | Radjy | ............. | G06Q 10/06315 705/7.25 |
| 2017/0029909 A1* | 2/2017 | Abbott | ..................... | C14C 3/30 |

FOREIGN PATENT DOCUMENTS

| | | | | |
|---|---|---|---|---|
| WO | WO-2007115576 A1 * | 10/2007 | ........... | A01K 11/008 |
| WO | WO-2010020014 A1 * | 2/2010 | .............. | B25J 9/104 |
| WO | WO-2012019607 A1 * | 2/2012 | ............... | C14B 1/02 |

OTHER PUBLICATIONS

Gunin, J. (2005). Made to order: American leather's unique model. Furniture Today, 3(1), 4-5. Retrieved from https://www.proquest.com/trade-journals/made-order-american-leathers-unique-model/docview/235468530/se-2?accountid=14753 (Year: 2005).*

* cited by examiner

| | 502 | 504 | 506 | 508 | 510 | 512 |
|---|---|---|---|---|---|---|
| | Custom Pallet ID | Hide Count | Hide Type | Hide Classification | Moisture Level | Grain Type |
| 514 | CP15050006 | 190 | Steer | AA | 60% | Full |
| 516 | CP15050007 | 160 | Jumbo | AS | 58% | Top |
| 518 | CP15050008 | 210 | Heifer | B | 58% | Split |
| 520 | CP15050009 | 170 | Jumbo | C | 56% | Split |

HIDE CUSTOMIZATION SYSTEMS AND METHODS

CROSS REFERENCE TO RELATED APPLICATIONS

This application is a continuation of U.S. application Ser. No. 14/724,643 filed May 28, 2015 which claims priority to and the benefit of U.S. Provisional Application No. 62/003,998 filed May 28, 2014. This application is related to U.S. application Ser. No. 14/714,006 filed May 15, 2015 and U.S. application Ser. No. 14/724,547 filed May 28, 2015. The entire contents of the foregoing applications are hereby incorporated by reference in their entireties.

BACKGROUND

1. Technical Field

One or more embodiments relate generally to processing hides. More specifically, one or more embodiments relate to systems and methods for customizing hides.

2. Background and Relevant Art

In general, tanning is the process of transforming raw animal hides into leather hides. Typically, tanning is performed by tanning facilities that receive raw animal hides from slaughterhouses or other facilities that skin animals. Upon receiving raw animal hides, tanning facilities usually subject hides to various tanning processes. For example, many tanning facilities use a mechanical and chemical tanning process, such as chrome tanning or vegetable tanning, to convert raw animal hides into leather hides. Once transformed into leather hides, tanning facilities may subject leather hides to additional processing before providing the leather hides to customers that generate finished leather products. However, while conventional tanning processes are useful in making leather hides, such processes suffer from several disadvantages.

One disadvantage is that conventional tanning processes often lack the ability to customize leather hides. More specifically, conventional tanning processes do not typically involve customizing leather hides in accordance with particular customer specifications (e.g., as indicated by a customer order). On the contrary, conventional tanning processes usually involve wringing, folding, stacking, and packaging leather hides in the same manner and without regard to specific customer needs or requirements. Furthermore, oftentimes conventional tanning processes produce leather hides that customers cannot readily use to generate finished leather products (e.g., the leather hides require additional processing prior to use in making finished leather products). As a result, customers (i.e. purchasers of leather hides) typically perform the customization of leather hides on their own, which is inconvenient and can often entail significant investments of customers' time, money, and other resources. Consequently, conventional tanning processes usually lead to reduced profits and diminished customer satisfaction as a result of failing to provide added value in the form of leather hides that are customized for immediate use by a particular customer.

Another disadvantage is that conventional tanning processes typically lack the ability to provide one or more packages of leather hides that exactly match the number of leather hides requested by a customer. In particular, since conventional tanning processes usually involve packaging a standard number of leather hides per package, customers are often limited to purchasing leather hides on a per package basis. Correspondingly, conventional tanning processes usually satisfy each customer order with one or more packages of leather hides that may not contain the exact number of leather hides needed by each customer. Consequently, conventional tanning processes frequently lead to unnecessary waste by requiring customers to purchase more leather hides than are needed (e.g., when a customer only wants 30 leather hides, but a conventional tanning facility only sells 60 leather hides per package). Additionally, conventional tanning processes are usually incapable of using a single package of leather hides to satisfy multiple customer orders. Accordingly, conventional tanning processes often experience reduced efficiency and limited responsiveness to customer orders as a result of an inability to produce packages of leather hides that exactly match customer orders.

Yet another disadvantage is that conventional tanning processes are unable to meet particular customer specifications because such processes typically cannot trace leather hides throughout a tanning facility. More specifically, conventional tanning processes often fail to record information related to customizing leather hides in accordance with particular customer specifications. For example, conventional tanning processes lack the ability to capture process information for a particular leather hide or package of leather hides (e.g., the identification of particular devices used in the tanning, sorting, customizing, or packaging processes). Moreover, most conventional tanning processes cannot identify and track individual leather hides or packages of leather hides, let alone associate process information with individual leather hides or packages of leather hides. Thus, by failing to record and associate information that provides traceability within a tanning facility, conventional tanning processes are less able to effectively provide leather hides specifically tailored to particular customer specifications.

Accordingly, there are a number of considerations to be made in processing and customizing hides.

SUMMARY

Embodiments disclosed herein provide benefits and/or solve one or more of the foregoing or other problems in the art with systems and methods for improving the processing of hides. More specifically, one or more embodiments improve the customization of hides. Furthermore, one or more embodiments provide systems and methods that improve the profitability, customer satisfaction, efficiency, and traceability associated with customizing hides in accordance with customer needs.

For example, one or more embodiments provide systems and methods that customize hides according to particular customer specifications. In particular, the systems and methods disclosed herein can provide a customized processing system that processes hides in accordance with customizations indicated by customer orders. Further, in one or more embodiments, a customized processing system can sufficiently process hides to an extent that customers can readily generate finished leather products from the hides. More specifically, in one or more embodiments, a customized processing system can split and/or fold hides according to customer orders, thereby eliminating the need for customers to perform such customizations on their own. Consequently, the systems and methods described herein can assist in adding value through the customization of hides, thereby leading to improved profitability and greater customer satisfaction.

Additional example embodiments can provide systems and methods that produce customized packages of hides tailored to particular customer orders. More specifically, the systems and methods disclosed herein can provide a customized processing system that identifies an exact number of hides indicated by a customer order and, in response, produces a customized package containing that exact number of hides. Furthermore, in one or more embodiments, a customized processing system can utilize a single package of hides to satisfy multiple customer orders. Accordingly, example systems and methods described herein can improve responsiveness to customer orders by more efficiently using standard packages of hides to produce customized packages of hides.

As a further example, one or more embodiments provide systems and methods that can more effectively meet particular customer specifications by improving traceability of hides throughout a tanning facility. In particular, the systems and methods disclosed herein can provide a tanning control system that captures information related to the customization of hides and the generation of customized packages made in response to customer orders. For instance, in one or more embodiments, a tanning control system can store identifications of particular devices used to customize hides and produce customized packages of hides. Moreover, in one or more embodiments, a tanning control system can generate and assign unique identifiers to individual customized hides and customized packages of hides. Furthermore, in one or more embodiments, a tanning control system can associate identifications of particular devices with unique identifiers of customized hides and customized packages of hides. Thus, the systems and methods disclosed herein can provide greater traceability, which in turn facilitates providing hides specifically tailored to particular customer specifications.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description, or may be learned by the practice of such exemplary embodiments as set forth hereinafter.

BRIEF DESCRIPTION OF THE DRAWINGS

In order to describe the manner in which the above recited and other advantages and features can be obtained, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dashes, dots, etc.) may be used to illustrate optional features or operations that add additional features to one or more embodiments. Such notation, however, should not be taken to mean that these are the only options or optional operations, and/or that blocks with solid borders are not optional in certain embodiments. Understanding that these drawings depict only typical embodiments and are not therefore to be considered to be limiting, such embodiments will be described and explained with additional specificity and detail through the use of the accompanying drawings in which:

FIG. 5 illustrates exemplary portions of a tanning system database in accordance with one or more embodiments;

DETAILED DESCRIPTION

Figure 1:
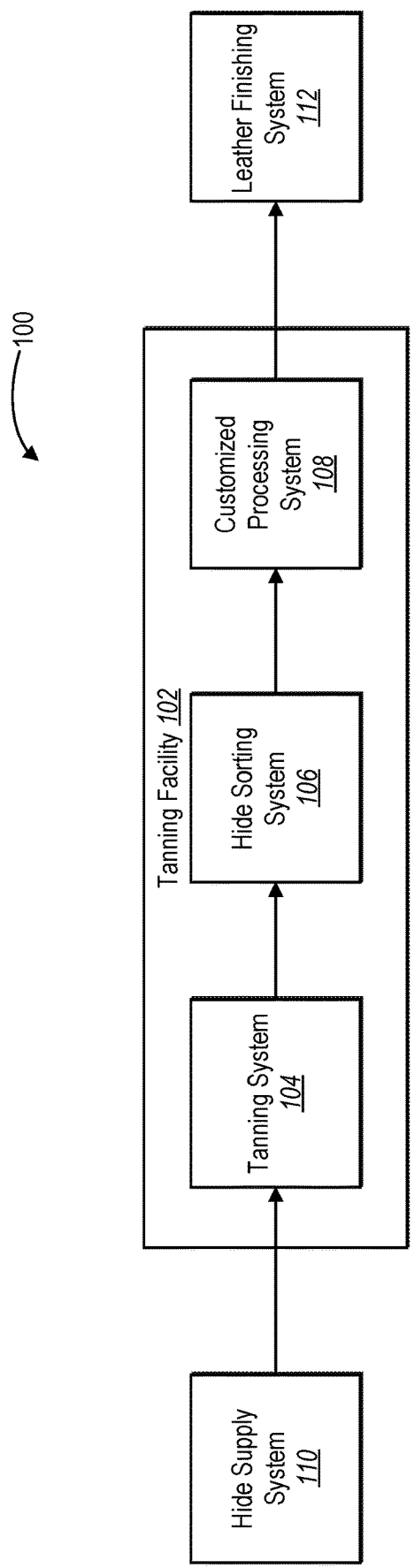
FIG. 1 illustrates a schematic diagram of a system for processing raw animal hides into leather in accordance with one or more embodiments.

One or more embodiments include a tanning control system that facilitates the processing of individual hides in accordance with particular customer requirements. For instance, a tanning control system can control various systems, such as a customized processing system, to perform the customization of individual hides based on customer orders. More specifically, a tanning control system can communicate with a customization controller to control the customization of hides performed by one or more devices of a customized processing system. Examples of customizations include, but are not limited to, wetting (e.g., rewetting), moisturizing (e.g., wringing), splitting, trimming (e.g., shaving and/or shaping), folding, and stacking hides. Further, in one or more embodiments, a tanning control system can utilize traceability information contained in a tanning system database to select packages of hides that are compatible with hide characteristics and specifications (e.g., customizations) indicated by electronic customer order information. Thus, by using traceability information and electronic customer order information, example embodiments of a tanning control system provide added value through the customization of hides according to customer orders, thereby enhancing profitability and customer satisfaction.

Furthermore, one or more embodiments of a tanning control system can facilitate the production of customized packages of hides that match the requirements of particular customer orders. For example, a tanning control system can identify an exact number of hides requested by a customer order and control a customized packaging system to produce one or more customized packages that satisfy the customer order. Moreover, a tanning control system can control the production of multiple customized packages of hides from a single non-customized package of hides. As a result, one or more embodiments of a tanning control system can satisfy multiple customer orders (e.g., as indicated by associated electronic customer order information) using an individual package of hides, thereby enhancing responsiveness to customer orders.

Moreover, in one or more embodiments, a tanning control system can enable more efficient production of customized packages of hides by utilizing multiple hide inventory sources. For example, a tanning control system can use packages of hides located at a hide supply system and/or a staging system to satisfy customer orders. More specifically, a tanning control system can utilize traceability information stored in a tanning system database to locate packages of hides that are compatible with particular customer orders. Furthermore, a tanning control system can communicate with a routing controller to direct the transportation of compatible packages of hides from a hide supply system and/or a staging system to a customized packaging system (e.g., via a rail system, conveyor system, etc.). Accordingly, example embodiments of a tanning control system can assist in a more effective use of hide inventory sources, which in turn can lead to greater output and profitability.

Additionally, in one or more embodiments, a tanning control system can enhance the traceability of customized hides and customized packages of hides. More specifically, a tanning control system can communicate with a customized processing system to capture traceability information related to one or more processes of the customized processing system. For instance, a tanning control system can generate a unique hide identifier for each customized hide and associate the hide identifier with data corresponding to one or more processes of a customized processing system. Similarly, a tanning control system can generate a unique package identifier for each customized package of hides and associate the package identifier with data corresponding to one or more processes of a customized processing system. Further, a tanning control system can identify device identifiers associated with devices of a customized processing system and associate the device identifiers with unique hide identifiers and/or package identifiers. Thus, by capturing traceability information related a customized processing system, example embodiments of a tanning control system can facilitate providing hides that meet particular customer specifications.

As used herein, the term "electronic customer order information" refers to any type of computer-based data that represents a customer order. For instance, electronic customer order information can include an identification of particular goods and/or services requested by a customer. The identification of particular goods and/or services requested by a customer can include an identification of one or more hide characteristics and/or one or more specifications. The term "hide characteristics" refers to information that describes hides and/or packages of hides. For instance, a hide characteristic can include a hide type, weight, grade, thickness, or surface area. The term "specification" refers to information that describes additional details regarding particular goods and/or services requested by a customer. For instance, a specification can include an identification of one or more customizations requested by a customer. Examples of customizations can include wetting (e.g., rewetting), moisturizing (e.g., wringing), splitting, trimming (e.g., shaving and/or shaping), folding, and stacking hides.

As also used herein, the term "package" refers to any group of hides. For instance, a group of hides can include a pallet with hides stacked on it. As another example, a group of hides can include a container of hides (e.g., a tub, bin, rolling cart, box, etc.). Additionally, the term "traceability information" refers to any type of computer-based data that identifies or represents the products and processes of a tanning facility. For example, the traceability information can include data related to batches of hides, such as a batch identifier, batch weight, batch hide count, or batch hide type. As another example, traceability information can include data related to individual hides, such as a hide identifier, hide type, weight, or grade. As yet a further example, traceability information can include data related to the customization of hides, such as a custom package identifier, custom package hide count, custom package hide type, custom package hide grade, custom package moisture level, or custom package grain type.

Moreover, as used herein, the term "hide inventory source" refers to any location within a tanning facility that contains hides and/or packages of hides. For example, a hide inventory source can include a hide sorting system that produces packages of hides. As another example, a hide inventory source can include a staging system that stores packages of hides on a longer term basis.

FIG. 1 is a schematic diagram illustrating a tannery system 100 (or simply "system 100") for processing raw animal hides into leather in accordance with some embodiments. An overview of system 100 will be described next in relation to FIG. 1. Thereafter, a more detailed description of the components and processes of system 100 will be described in relation to the remaining figures.

As illustrated by FIG. 1, the system 100 can include a tanning facility 102. As further illustrated in FIG. 1, tanning facility 102 can include a tanning system 104, a hide sorting system 106, and/or a customized processing system 108. Moreover, as FIG. 1 illustrates, the system 100 can include a hide supply system 110 and/or a leather finishing system 112. As explained in greater detail below, each component 104-108 of the tanning facility 102, as well as components 110 and 112, can be managed and/or controlled by one or more computing devices.

In general, and as FIG. 1 illustrates, system 100 can include a hide supply system 110 that provides raw animal hides obtained from the slaughter of certain animals. For example, the hide supply system 110 provides raw animal hides to tanning system 104 of tanning facility 102. Tanning system 104 employs various tanning systems, processes, machinery, and apparatuses to transform the raw animal hides into leather. After the tanning system 104 transforms the hides into leather, a hide sorting system 106 then sorts and stacks the hides. After the hides are sorted and stacked by hide sorting system 106, a customized processing system 108 can provide further processing or customizations (e.g., wetting, moisturizing, splitting, trimming, folding, stacking, etc.) according to additional customized specifications (e.g., as indicated by a customer order). Following processing by customized processing system 108, a leather finishing system 112 produces finished leather from the hides.

In one or more embodiments of system 100, hide supply system 110 can be a slaughterhouse. For example, hide supply system 110 can be a slaughterhouse for hooved livestock (e.g., cattle, sheep, pigs, goats, etc.) or a slaughterhouse for exotic animals (e.g., deer, bison, buffalo, ostrich, kangaroo, crocodile, alligator, snake, eel, and stingray). Alternatively, hide supply system 110 can be a knackery (i.e. a facility where animals are not slaughtered for human consumption). Additionally, hide supply system 110 can be part of, and physically located proximate to or within, tanning facility 102.

Regardless of whether hide supply system 110 is a slaughterhouse, knackery, or a system proximate to, or within, tanning facility 102, hide supply system 110 produces raw animal hides that can be tanned into leather by tanning facility 102. In one or more embodiments, hide supply system 110 obtains raw animal hides by skinning animals as part of the slaughtering process. Furthermore, hide supply system 110 can perform curing of the raw animal hides either by treating the raw animal hides with salt (e.g., by wet-salting or brine-curing the hides) or preserving the raw animal hides at a cold temperature (e.g., by packing the hides with ice). Moreover, hide supply system 110 can pack the raw animal hides, whether cured or uncured, into transport containers, which are then loaded onto a transport vehicle (e.g., a semi-trailer truck) for delivery to tanning facility 102.

Additionally, in one or more embodiments hide supply system 110 can use one or more computing devices to generate and store hide supplier information to associate with hides that the hide supply system 110 provides. For example, hide supply system 110 can mark or otherwise associate a container of hides with various types of hide supplier information. In one or more embodiments, hide supply system 110 can generate a hide supplier information file to associate with a container of hides, provide access to the hide supplier information file to the tanning facility 102, and tag the transport container (e.g., with a computer readable code, such as a barcode or QR code) so that the tanning facility 102 can access the hide supplier information file upon receiving the container of hides (e.g., scanning the barcode or QR code to access the hide supplier information over a network).

The hide supplier information can include various types of information. For example, the hide supplier information may include a plant identifier (e.g., a slaughterhouse name and/or location), transport vehicle identifiers (e.g., semi-trailer truck vehicle identification numbers or VINs), transport container identifiers (e.g., unique numerical identifiers), and a date of slaughter for the raw animal hides. In addition, the hide supplier information can include information related to hide characteristics, such as hide type, packaged hide weight, pre-packed hide weight, source of hides (e.g., cattle ranch location) and any other hide characteristic. Accordingly, in one or more embodiments, hide supply system 110 can then use one or more computing devices to provide the hide supplier information to tanning facility 102 in order to facilitate greater traceability of hides and enable tanning facility 102 to further refine its tanning processes.

Alternatively or additionally, in one or more embodiments hide supply system 110 can provide hide supplier information in documentation that accompanies the transport vehicle and/or transport containers received by tanning facility 102. For example, hide supply system 110 can mark transport containers of raw animal hides with hide supplier information labels which can be read or input into one or more computing devices of tanning facility 102 (e.g., a tanning system database of a tanning control system as discussed in greater detail below). Accordingly, the input of hide supplier information from hide supply system 110 into one or more computing devices of tanning facility 102 enables traceability of hides from their origin. Thus, this level of traceability assists tanning facility 102 in troubleshooting problems or reducing inefficiencies in tanning processes that may be due to issues associated with a particular hide supply system 110.

As further illustrated by FIG. 1, one or more embodiments of system 100 include a tanning system 104 that can receive raw animal hides from hide supply system 110. For example, tanning system 104 can receive raw animal hides in transport containers shipped from hide supply system 110 to tanning facility 102 using a transport vehicle. Furthermore, after receiving raw animal hides, tanning system 104 can transform the raw animal hides into leather. As an example, tanning system 104 can use various systems, processes, machinery, and apparatuses to transform raw animal hides into wet-blue leather hides. As an alternative example, tanning system 104 can use various systems, processes, machinery, and apparatuses to transform raw animal hides into wet-white leather hides.

Moreover, in one or more embodiments, tanning system 104 can generate and store tannery process information related to batches of raw animal hides and associate or incorporate hide supplier information into the tannery process information to provide improved traceability. Also, as discussed in greater detail below, tanning system 104 can use one or more computing devices to manage and control the various systems, processes, machinery, and apparatuses used to convert the raw animal hides into leather.

As FIG. 1 illustrates, one or more embodiments of tanning facility 102 include a hide sorting system 106. More specifically, hide sorting system 106 can receive hides produced by the tanning processes of tanning system 104. For example, hide sorting system 106 can receive hides that are automatically transported from tanning system 104 to hide sorting system 106 (e.g., via a rail system, conveyor system, etc.). As an alternative example, hide sorting system 106 can receive hides that are manually transported from tanning system 104 to hide sorting system 106 (e.g., via rolling carts or other mobile containers).

Furthermore, in one or more embodiments hide sorting system 106 grades the hides received from tanning system 104. For example, hide sorting system 106 can grade the hides using computer vision and machine learning techniques that assign a grade to each hide. Alternatively, hide sorting system 106 can grade the hides manually using a human operator to inspect each hide and assign a grade to each hide.

The grading system used by hide sorting system 106 can be a national hide grading standard, an international hide grading standard, an industry-wide hide grading standard, or a proprietary hide grading standard. For example, a proprietary hide grading standard can assign an "AA" grade to hides that include a single butt brand, light healed scratches through the prime, isolated light open scratches at the margins, and are suitable for full grain aniline or semi-aniline leather applications; an "AS" grade to hides that include two butt brands or butt and center brands, light healed scratches through the prime, isolated light open scratches at the margins, and are suitable for full grain aniline or semi-aniline leather applications; a "B" grade to hides that include up to two brands, including both butt and rib brands, with medium healed scratches and open scratches through the prime, and are suitable for pigmented or lightly tanned leather applications; and a "C" grade to hides that include multiple brands, minimal open scratches, multiple healed scratches throughout the hides, and are suitable for corrected grain leather applications.

As an alternative example, a proprietary hide grading standard can assign an "A" grade to hides that are free from parasite damage, contain butt brands, have light open and healed scratches throughout the prime, and are suitable for full grain aniline or semi-aniline leather applications; a "B" grade to hides that have healed parasite damage at the margins, butt brands, medium healed and open scratches in the prime, and are suitable for pigmented or lightly tanned leather applications; a "C" grade to hides that have heavy parasite damage, multiple brands, open scratches through the prime, and are suitable for corrected grain leather; and a "Reject" grade to hides that are misshapen, damaged, or have gross processing defects, but nevertheless are suitable for heavily embossed leathers.

In one or more embodiments, hide sorting system 106 sorts, folds, stacks, and packs each hide in response to, at least in part, a grade being assigned to each hide. For example, hide sorting system 106 can include a plurality of stacking sites, such that hides of the same grade can be sorted, folded, stacked, and packed at the same stacking site. Additionally, hide sorting system 106 can perform wetting (e.g., rewetting), moisturizing (e.g., sammying or wringing), splitting, and/or trimming (e.g., shaving and/or shaping) of the hides prior to sorting, folding, and stacking each hide at a particular stacking site.

Moreover, in one or more embodiments, the hide sorting system 106 can tag, mark, or otherwise label each hide with a unique hide identifier that can be stored by one or more computing devices of tanning facility 102 for purposes of improved traceability and quality assurance. Furthermore, the hide sorting system 106 can associate the unique hide identifier for each hide with the assigned grade for each hide, as well as other tannery process information that the tanning facility 102 can generate and store using one or more computing devices. In one or more embodiments, the tanning facility 102 can assign a unique hide identifier before a grade is assigned to a particular hide, or alternatively, the hide sorting system 106 can assign a grade to a hide before a unique hide identifier is assigned to a particular hide. Thus, the association of a unique hide identifier to a grade of a hide can occur once the hide sorting system 106 determines both items of information.

As further illustrated by FIG. 1, tanning facility 102 can include a customized processing system 108. In one or more embodiments, customized processing system 108 receives hides that the hide sorting system 106 has previously graded. For example, customized processing system 108 can receive hides that are automatically transported (e.g., via a rail system, conveyor system, etc.) from hide sorting system 106, or alternatively, customized processing system 108 can receive hides that are manually transported (e.g., via rolling carts or other mobile containers) from hide sorting system 106.

Moreover, in one or more embodiments, customized processing system 108 performs further processing on hides. As an example, customized processing system 108 can rewet and/or wring (i.e. sammy) hides to a moisture level according to customer requirements (e.g., as indicated by a customer order or specification). As a further example, customized processing system 108 can trim and/or shave the hides to a particular size, split the hides to a specified thickness, and/or fold the hides in a certain manner. Thus, customized processing system 108 can perform one or more processes, including for example, trimming, shaving, splitting, and folding, and the one or more processes can be tailored according to customer requirements (e.g., as indicated by a customer order or specification). Furthermore, customized processing system 108 can pack the hides for shipment or storage purposes.

FIG. 1 further illustrates that system 100 can include a leather finishing system 112. In one or more embodiments, leather finishing system 112 receives hides from tanning facility 102 and transforms those hides into finished leather using a variety of processes. For example, leather finishing system 112 can perform any number of leather finishing processes, including retanning, coloring, fatliquoring, setting out, drying, conditioning, staking, dry milling, buffing, finishing, and/or plating. Once leather finishing system 112 converts the hides into finished leather, leather product manufacturers can use the finished leather to make leather products for end consumers.

Figure 2:
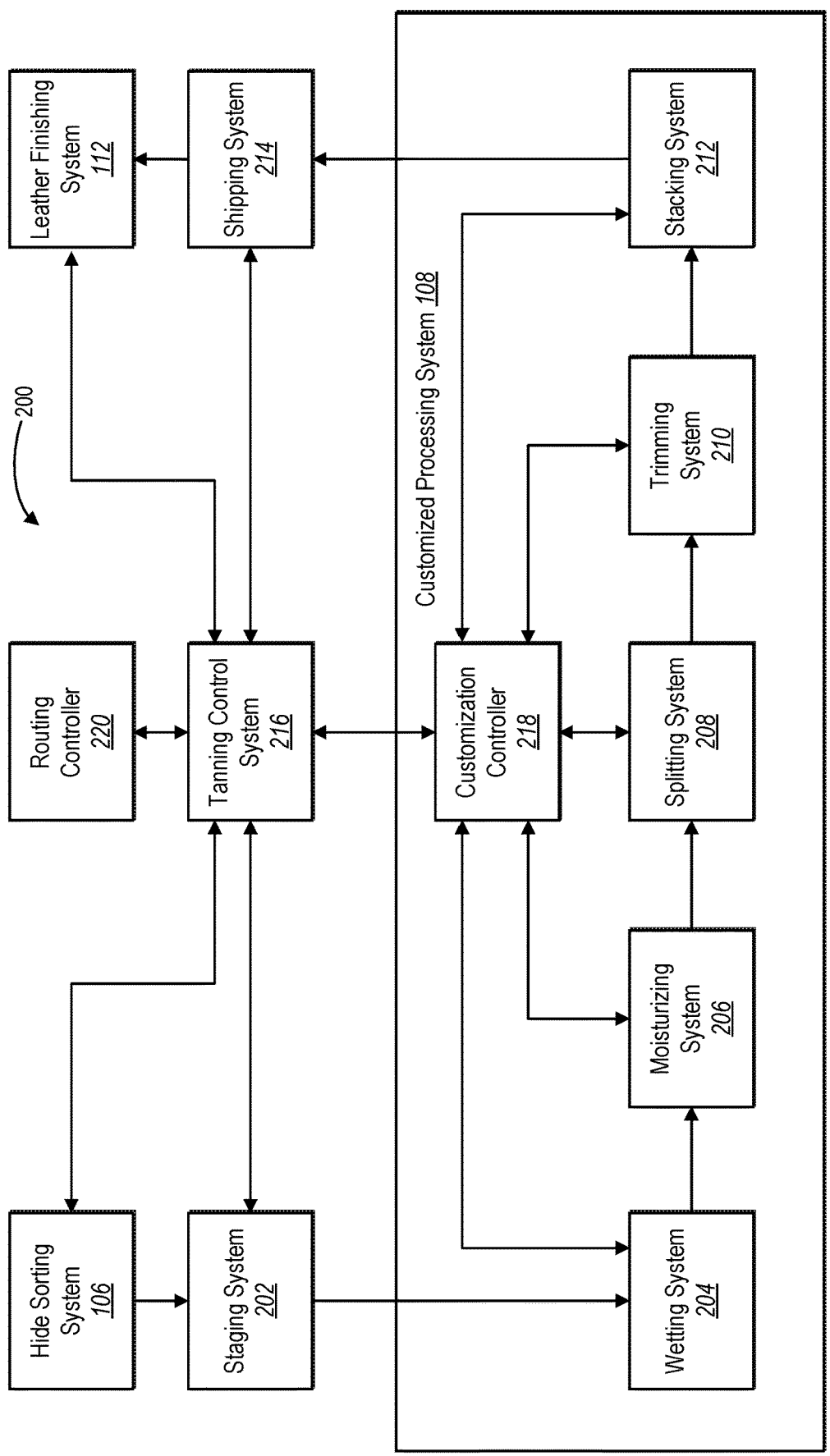
FIG. 2 illustrates a detailed schematic diagram of a customized processing system of FIG. 1 in accordance with one or more embodiments.

FIG. 2 illustrates a detailed schematic diagram of a system 200 that, in accordance with one or more embodiments, shows a customized processing system 108 of a tanning facility 102 of FIG. 1. FIG. 2 further illustrates that customized processing system 108 can include a wetting system 204, a moisturizing system 206, a splitting system 208, a trimming system 210, a stacking system 212, and a customization controller 218. FIG. 2 also illustrates that system 200 includes hide sorting system 106 and leather finishing system 112 of FIG. 1. Moreover, as shown by FIG. 2, the system 200 can include a staging system 202, a shipping system 214, a tanning control system 216, and a routing controller 220.

As FIG. 2 illustrates, one or more embodiments of system 200 include a hide sorting system 106. More specifically, hide sorting system 106 can receive hides (or containers of hides) from a tanning system, such as tanning system 104 of FIG. 1, and then sort the hides into packages. After sorting hides into packages, hide sorting system 106 can provide the packages to staging system 202 (e.g., via a rail system, conveyor system, etc.). Additionally, after sorting hides into packages, hide sorting system 106 can provide the packages to customized processing system 108 (e.g., via a rail system, conveyor system, etc.). Furthermore, after sorting hides into packages, hide sorting system 202 can provide the packages to shipping system 214 (e.g., via a rail system, conveyor system, etc.). Various embodiments of hide sorting system 106 are described in greater detail in U.S. application Ser. No. 14/724,547, the entire contents of which are hereby incorporated by reference in their entirety.

As further shown by FIG. 2, one or more embodiments of system 200 include a staging system 202. In particular, staging system 202 can receive packages of hides from hide sorting system 106. For example, staging system 202 can receive packages of hides transported from hide sorting system 106 via a rail system and/or conveyor system. Alternatively, staging system 202 can receive packages of hides manually transported from hide sorting system 106.

Furthermore, in one or more embodiments, staging system 202 includes a staging area that can store a plurality of packages of hides. For example, staging system 202 can include an area within a tanning facility designated for storing packages of hides. As another example, staging system 202 can include another facility (e.g., a warehouse) that is separate from, but proximate to, a tanning facility. Additionally, staging system 202 can include machinery and other devices that facilitate the automated movement of packages of hides to, from, and within the staging system 202.

Moreover, in one or more embodiments, staging system 202 can provide packages of hides to various other systems within system 200. For example, staging system 202 can provide packages of hides to customized processing system 108 (e.g., via a rail system, conveyor system, etc.). In addition, staging system 202 can provide packages of hides to shipping system 214 (e.g., via a rail system, conveyor system, etc.).

As FIG. 2 shows, in one or more embodiments, customized processing system 108 receives packages of hides from staging system 202. Additionally or alternatively, customized processing system 108 can receive packages of hides from hide sorting system 106. Regardless, upon receiving one or more packages of hides, customized processing system 108 performs one or more customizations on one or more hides from the received packages of hides, as described in further detail below.

As FIG. 2 illustrates, one or more embodiments of customized processing system 108 can include a wetting system 204. More specifically, a wetting system 204 performs wetting (or rewetting) of the hides. For example, wetting system 204 can include one or more wetting drums. Examples of wetting drums may include but are not limited to drums made by Gozzini 1906 Turini Group S.R.L., Hüni A.G., Pajusco Tecnologie S.P.A., Poletto S.T.A. S.R.L., and Vallero International S.P.A. The drums subject the hides to one or more chemicals (e.g., detergents and water, etc.) that are used to rewet the hides to make the hides pliable again. Additionally or alternatively, wetting system 204 can include one or more wetting tubs, which can immerse the hides in one or more chemicals to make the hides wet and pliable again. As another alternative, wetting system 204 can include one or more sprayers (e.g., in spray cabinets) that rewet the hides by spraying one or more chemicals on the hides.

As shown by FIG. 2, one or more embodiments of customized processing system 108 can include a moisturizing system 206 that processes the hides to a specified moisture level. For example, moisturizing system 206 can include one or more wringing devices (i.e. sammying machines) that squeeze the hides to a specified moisture level. Examples of wringing devices may include but are not limited to wringing devices made by Gozzini 1906 Turini Group S.R.L., Poletto S.T.A. S.R.L., and Rizzi S.P.A. As another example, moisturizing system 206 can include one or more dryers (e.g., mechanical, industrial dryers) that dry the hides to a specified moisture level. As an even further example, moisturizing system 206 can include one or more hangers (e.g., hangers on a hook conveyor system) that dry the hides to a specified moisture level.

As further shown by FIG. 2, one or more embodiments of customized processing system 108 can include a splitting system 208 that can split the hides to a specified thickness. For instance, splitting system 208 can include one or more splitting devices (i.e. splitters) that split the hides to a specified thickness. Splitting devices may include but are not limited to splitting devices made by Mosconi S.P.A., Poletto S.T.A. S.R.L. and Rizzi S.P.A. Additionally, in one or more embodiments, splitting system 208 can separate hides into a top grain hide and a split (i.e. drop split) grain hide. Accordingly, in one or more embodiments, the splitting devices of splitting system 208 can split the top grain and/or the split grain of a hide to specified thicknesses.

FIG. 2 also illustrates that one or more embodiments of customized processing system 108 can include a trimming system 210 that trims, shaves, and/or shapes hides. For example, trimming system 210 can include one or more trimming devices that trim, shave, and/or shape hides according to customer orders. Examples of trimming devices include but are not limited to shaving machines made by Gozzini 1906 Turini Group S.R.L., Mosconi S.P.A., Poletto S.T.A. S.R.L., and Rizzi S.P.A. Furthermore, in one or more embodiments, the trimming devices of trimming system 210 can trim and/or shave the surface and/or edges of hides. Additionally, in one or more embodiments, the trimming devices of trimming system 210 can trim the hides to a specified thickness and/or cut the hides to a specified shape (e.g., a rectangle, square, oval, circle, standardized hide shape, etc.).

As FIG. 2 shows, one or more embodiments of customized processing system 108 can include a stacking system 212 that stacks customized hides to form one or more customized packages (e.g., custom pallets). More specifically, stacking system 212 can include a conveyor system that accesses a plurality of stacking sites (e.g., a belt conveyor with stacking sites on each side of the belt conveyor) used to make customized packages. Thus, each stacking site can include one or more pallets to stack hides on. Additionally, each stacking site can include a folding device that folds hides in a specified manner. Moreover, in one or more embodiments, stacking system 212 can be similar to a stacking system of hide sorting system 106. For example, stacking system 212 can include a marking device that marks or otherwise labels customized hides and/or customized packages of hides with unique identifiers. Various embodiments of a stacking system of hide sorting system 106 are described in greater detail in U.S. application Ser. No. 14/724,547, the entire contents of which are hereby incorporated by reference in their entirety.

Furthermore, in one or more embodiments, customized processing system 108 can include a verifying system that performs quality assurance measurements and inspections on hides folded and stacked by stacking system 212. For example, a verifying system can include one or more measuring devices that can measure one or more measurements of hides to determine that the hides have been customized according to customer orders. Accordingly, in one or more embodiments, verifying system can be included as part of stacking system 212 or, alternatively, verifying system can be between stacking system 212 and shipping system 214.

FIG. 2 further illustrates that, in one or more embodiments, stacking system 212 provides hides to shipping system 214. More specifically, once stacking system 212 has completed a package of hides, stacking system 212 can provide the package of hides to shipping system 214. For example, stacking system 212 can use a rail system and/or conveyor system to transport the package of hides to the shipping system 214. Additionally, shipping system 214 can include a loading dock for a transport vehicle (e.g., a semi-trailer truck and/or train). Thus, once the package of hides is received at shipping system 214, the package of hides can be transported to a customer that may then generate finished leather products from the hides using leather finishing system 112. Various embodiments of a leather finishing system 112 are described above in reference to FIG. 1.

FIG. 2 also shows that one or more embodiments of customized processing system 108 include a customization controller 218. More specifically, customization controller 218 can include one or more computing devices that communicate with tanning control system 216 to facilitate the customization of hides. For example, customization controller 218 can include a programmable logic controller (PLC) that receives information regarding customizations from tanning control system 216 and controls wetting system 204, moisturizing system 206, splitting system 208, trimming system 210, and/or stacking system 212 based on the received information.

In one or more embodiments, customized processing system 108 can include more systems, controllers, devices, and other components than FIG. 2 illustrates. Alternatively, in other embodiments customized processing system 108 can include fewer systems, controllers, devices, and other components than shown by FIG. 2. Additionally, in some embodiments, wetting system 204, moisturizing system 206, splitting system 208, trimming system 210, and stacking system 212 may be ordered and/or arranged in a different way than FIG. 2 illustrates.

Furthermore, in one or more embodiments, wetting system 204, moisturizing system 206, splitting system 208, trimming system 210, and stacking system 212 can be interconnected by one or more rail systems and/or conveyor systems. For example, one or more conveyor systems (e.g., belt conveyors, hook conveyors, etc.) can facilitate the transport of hides from wetting system 204 to moisturizing system 206, from moisturizing system 206 to splitting system 208, from splitting system 208 to trimming system 210, and from trimming system 210 to stacking system 212. Likewise, one or more rail systems and/or conveyor systems can provide hides to customized processing system 108 (e.g., from staging system 202). Similarly, one or more rail systems and/or conveyor systems can provide hides to shipping system 214 (e.g., from stacking system 212).

As FIG. 2 shows, one or more embodiments of system 200 can include a routing controller 220. More specifically, routing controller 220 can control the various rail systems and/or conveyor systems that transport hides and/or packages of hides between the various systems illustrated in FIG. 2. For example, routing controller 220 can include one or more computing devices that communicate with tanning control system 216 to facilitate the transportation of hides and/or packages of hides. For example, routing controller 220 can include a programmable logic controller (PLC) that receives routing communications from tanning control system 216 and controls various rail systems and/or conveyor systems to transport hides and/or packages of hides throughout the systems illustrated in FIG. 2.

As FIG. 2 also shows, one or more embodiments of system 200 can include a tanning control system 216. In particular, tanning control system 216 can control the various systems depicted in FIG. 2. For example, as described in greater detail in U.S. application Ser. No. 14/724,547, the entire contents of which are hereby incorporated by reference in their entirety, tanning control system 216 can control hide sorting system 106. As a further example, tanning control system 216 can control staging system 202 and/or shipping system 214. Moreover, in one or more embodiments, tanning control system 216 can control routing controller 220 as previously described. Furthermore, in one or more embodiments, tanning control system 216 can communicate with leather finishing system 112 to provide information concerning packages of hides provided to customers. Additionally, in one or more embodiments, tanning control system 216 can control customization controller 218 to direct the customizations performed by customized processing system 108. Accordingly, as FIG. 2 illustrates, one or more embodiments provide a system that facilitates the customization of hides and the production of custom packages of hides based on customer orders.

Figure 3:
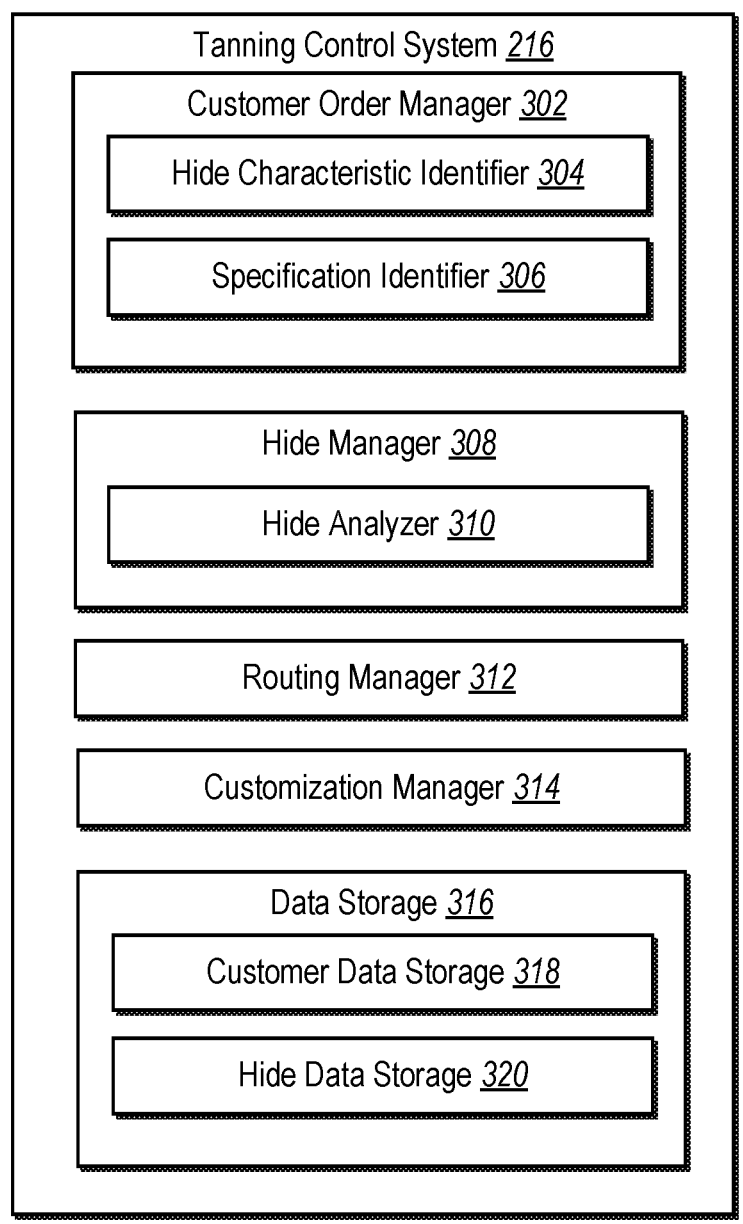
FIG. 3 illustrates a detailed schematic diagram of a tanning control system of FIG. 2 in accordance with one or more embodiments.

FIG. 3 illustrates a detailed schematic diagram of tanning control system 216 of FIG. 2. In particular, FIG. 3 illustrates that tanning control system 216 can include a customer order manager 302, a hide manager 308, a routing manager 312, and a customization manager 314. Moreover, FIG. 2 illustrates that, in one or more embodiments, customer order manager 302 can include a hide characteristic identifier 304 and a specification identifier 306. Furthermore, FIG. 2 illustrates that, in one or more embodiments, hide manager 308 can include a hide analyzer 310. In addition, FIG. 3 illustrates that the tanning control system 216 can include a data storage 316, which, in one or more embodiments, can further include customer data storage 318 and hide data storage 320. As explained in greater detail below, each component 302-320 of the tanning control system 216 can execute on and/or be implemented by one or more computing devices.

As FIG. 3 illustrates, tanning control system 216 can include a customer order manager 302. More specifically, customer order manager 302 manages the fulfillment of customer orders by the tanning facility. For example, customer order manager 302 can receive customer orders from an e-commerce customer ordering system (e.g., e-commerce customer ordering system 802 of FIG. 8, described in further detail below). Alternatively, customer order manager 302 can access customer orders received and stored by an e-commerce customer ordering system. Moreover, customer order manager 302 can generate electronic customer order information based on the received or accessed customer orders.

Furthermore, customer order manager 302 can prioritize fulfilling customer orders in a variety of ways. For example, customer order manager 302 can prioritize fulfilling customer orders using a first-in-first-out (FIFO) approach based on the time each customer order is submitted. As another example, customer order manager 302 can prioritize fulfilling customer orders based on the availability of compatible hides stored at one or more hide inventory sources (i.e. customer orders that can be satisfied with current hide inventory are fulfilled first). As a further example, customer order manager 302 can prioritize fulfilling customer orders based on order size (e.g., number of hides and/or packages of hides). More specifically, customer order manager 302 can prioritize fulfilling small customer orders over large customer orders (e.g., smallest first) or vice versa (e.g., largest first). As yet another example, customer order manager 302 can prioritize fulfilling customer orders based on customer size (e.g., customer orders of largest customers fulfilled first based on volume of hides purchased by customers over time). Furthermore, in prioritizing customer orders, customer order manager 302 can identify a status for each customer order (e.g., by using status indicators, such as pending with compatible hides in inventory, pending without compatible hides in inventory, and complete). Accordingly, in one or more embodiments, customer order manager 302 assists in responsively satisfying customer orders.

As FIG. 3 also shows, customer order manager 302 can include a hide characteristic identifier 304. In particular, hide characteristic identifier 304 can identify one or more hide characteristics indicated by a customer order. For example, hide characteristic identifier 304 can identify one or more hide characteristics within electronic customer order information associated with a customer order. Additionally, hide characteristic identifier 304 can identify a number of hides requested by a customer order (i.e. a hide count). Consequently, in one or more embodiments, hide characteristic identifier 304 facilitates determining the hides requested by particular customer orders.

As further illustrated by FIG. 3, customer order manager 302 can include a specification identifier 306. In particular, specification identifier 306 can identify a specification indicated by a customer order. As an example, specification identifier 306 can identify one or more customizations indicated by a specification associated with electronic customer order information. More specifically, specification identifier 306 can identify a wetting indicator that indicates hides are to be wet (e.g., by wetting system 204). Further, specification identifier 306 can identify a moisturizing level indicator that indicates hides are to be processed to a particular moisture level (e.g., by moisturizing system 206). Moreover, specification identifier 306 can identify a splitting indicator that indicates hides are to be split (e.g., by splitting system 208). Additionally, specification identifier 306 can identify one or more trimming indicators that indicate hides are to be trimmed (e.g., shaved on the hide surface, trimmed on the hide edges, and/or cut to a particular shape by trimming system 210). Specification identifier 306 can also identify a folding indicator that indicates hides are to be folded in a particular manner (e.g., by a folding device of stacking system 212). Likewise, specification identifier 306 can identify a stacking indicator that indicates hides are to be stacked in a certain way (e.g., by stacking system 212). Accordingly, in one or more embodiments, specification identifier 306 aids in tailoring hides and packages of hides to specifications associated with customer orders.

FIG. 3 also illustrates that tanning control system 216 can include a hide manager 308. In particular, hide manager 308 manages the inventory of packages of hides located at one or more hide inventory sources. For instance, hide manager 308 tracks the location of individual packages of hides based on a unique package identifier associated with each package. Thus, for example, when a package of hides is transported from a hide sorting system (e.g., hide sorting system 106) to a staging system (e.g., staging system 202), hide manager 308 can update a location identifier associated with the unique identifier of the package of hides. Similarly, when a package of hides is transported from either a hide sorting system (e.g., hide sorting system 106) or a staging system (e.g., staging system 202) to a customized processing system (e.g., customized processing system 108), hide manager 308 can update a location identifier associated with the unique identifier of the package of hides. As a result, in one or more embodiments, hide manager 308 enhances the traceability of packages of hides throughout a tanning facility.

As further illustrated by FIG. 3, hide manager 308 can include a hide analyzer 310. More specifically, hide analyzer 310 can analyze a customer order and one or more packages of hides to determine one or more packages of hides that can be used to satisfy the customer order. For example, hide analyzer 310 can compare hide characteristics indicated by a customer order with characteristics associated with packages of hides and, based on the comparison, hide analyzer 310 can determine packages of hides that are compatible with the customer order. As a more particular example, hide analyzer 310 can compare a hide grade and a hide type (e.g., jumbo, heifer, or steer) indicated by a customer order with hide grades and hide types associated with one or more packages of hides stored at a hide inventory source of the tanning facility. Thus, hide analyzer 310 can determine packages of hides to use to fulfill a particular customer order by matching characteristics indicated by the customer order with characteristics of the packages of hides.

Furthermore, hide analyzer 310 can determine a number of packages of hides needed to satisfy a customer order. For example, hide analyzer 310 can compare a hide count indicated by a customer order with a hide count associated with one or more compatible packages of hides. Consequently, hide analyzer 310 can determine whether an adequate number of compatible packages of hides are available to satisfy a customer order, and if not, hide analyzer 310 can determine that additional compatible packages of hides need to be obtained or produced (e.g., by hide sorting system 106). Accordingly, in one or more embodiments, hide analyzer 310 can assist in fulfilling customer orders as specified by matching characteristics of packages of hides to characteristics of customer orders.

FIG. 3 also shows that tanning control system 216 can include a routing manager 312. More specifically, routing manager 312 can provide routing communications to a routing controller (e.g., routing controller 220) that controls the transport of hides and/or packages of hides throughout a tanning facility. For example, routing manager 312 can provide a routing communication that indicates a unique identifier of a hide or package of hides, a source location of the hide or package of hide, and a destination location for the hide or package of hides. Thus, as a further example, routing manager 312 can provide a routing communication to a routing controller that controls the transport of a package of hides from staging system (e.g., staging system 202) to a customized processing system (e.g., customized processing system 108) via a rail system and/or conveyor system. As an alternative example, routing manager 312 can provide a routing communication to a routing controller that controls the transport of a package of hides from hide sorting system (e.g., hide sorting system 106) to a customized processing system (e.g., customized processing system 108) via a rail system and/or conveyor system. Accordingly, routing manager 312 can determine a routing communication based on the compatible package of hides identified and located by hide manager 308 and whether the specification of the customer order indicates any customizations, as identified by customer order manager 302.

Moreover, routing manager 312 can provide routing communications to a routing controller (e.g., routing controller 220) that controls the transport of hides through the various systems of a customized processing system (e.g., customized processing system 108 of FIG. 2). In particular, routing manager 312 can provide routing communications that control the transport of hides to a particular stacking site of a stacking system (e.g. via a conveyor system of stacking system 212). More specifically, routing manager 312 can provide a routing communication that indicates a unique identifier of a hide and a unique identifier of a stacking site. Additionally, routing manager 312 can provide one or more routing communications that control the transport of hides from a wetting system to a moisturizing system, from a moisturizing system to a splitting system, from splitting system to a trimming system, and from a trimming system to a stacking system (e.g., through and between the systems shown in FIG. 2).

FIG. 3 also illustrates that tanning control system 216 can include a customization manager 314. In particular, customization manager 314 can provide a specification communication to a customization controller (e.g., customization controller 218) that controls various systems of a customized processing system (e.g., customized processing system 108). For instance, based on the specifications identified by a specification identifier 306, customization manager 314 can provide a specification communication to customization controller 218 of customized processing system 108. More specifically, the specification communication can include indications of the customizations indicated by a customer order. Additionally, the specification communication can include an identification of the hides and/or packages of hides to be customized. Accordingly, customization manager 314 can facilitate customizing hides based on customer orders.

Moreover, in one or more embodiments, routing manager 312 and/or customization manager 314 can capture traceability information related to hides processed by customized processing system 108. For example, routing manager 312 can capture and associate unique identifiers of individual hides and packages of hides with unique identifiers of rail systems and/or conveyor systems used to transport those hides. Along similar lines, customization manager 314 can capture and associate unique identifiers of individual hides and packages of hides with unique identifiers of systems and/or devices of customized processing system 108 used to process those hides. Consequently, in one or more embodiments, routing manager 312 and/or customization manager 314 enhance traceability by capturing information related to the customization of hides.

Additionally, FIG. 3 illustrates that in one or more embodiments the tanning control system 216 can include a data storage 316 that stores electronic information associated with processing hides and fulfilling customer orders. In one or more embodiments data storage 316 includes customer data storage 318. For example, customer data storage 318 can store information related to customer orders (e.g., electronic customer order information). More specifically, customer data storage 318 can store hide characteristics and specifications (e.g., customizations) indicated by customer orders. Additionally, customer data storage 318 can include customer profile information, such as name, address, phone, email, other contact information, billing information, and default specification preferences (e.g., default specifications for wetting, moisturizing, splitting, trimming, folding, stacking, and/or packaging if not already expressly indicated by a customer order). Further, in one or more embodiments, data storage 316 includes hide data storage 320. For example, hide data storage 320 can include information related to individual hides and packages of hides (e.g., unique hide identifiers, unique package identifiers, hide characteristics, characteristics associated with packages, locations, etc.). Moreover, hide data storage 320 can include traceability information (e.g., as stored in a tanning system database). Thus, in one or more embodiments data storage 316, customer data storage 318, and/or hide data storage 320 include one or more databases (e.g., relational databases, non-relational databases, XML databases, JSON databases, SQL databases, NoSQL databases, cloud databases, etc.).

Figure 4:
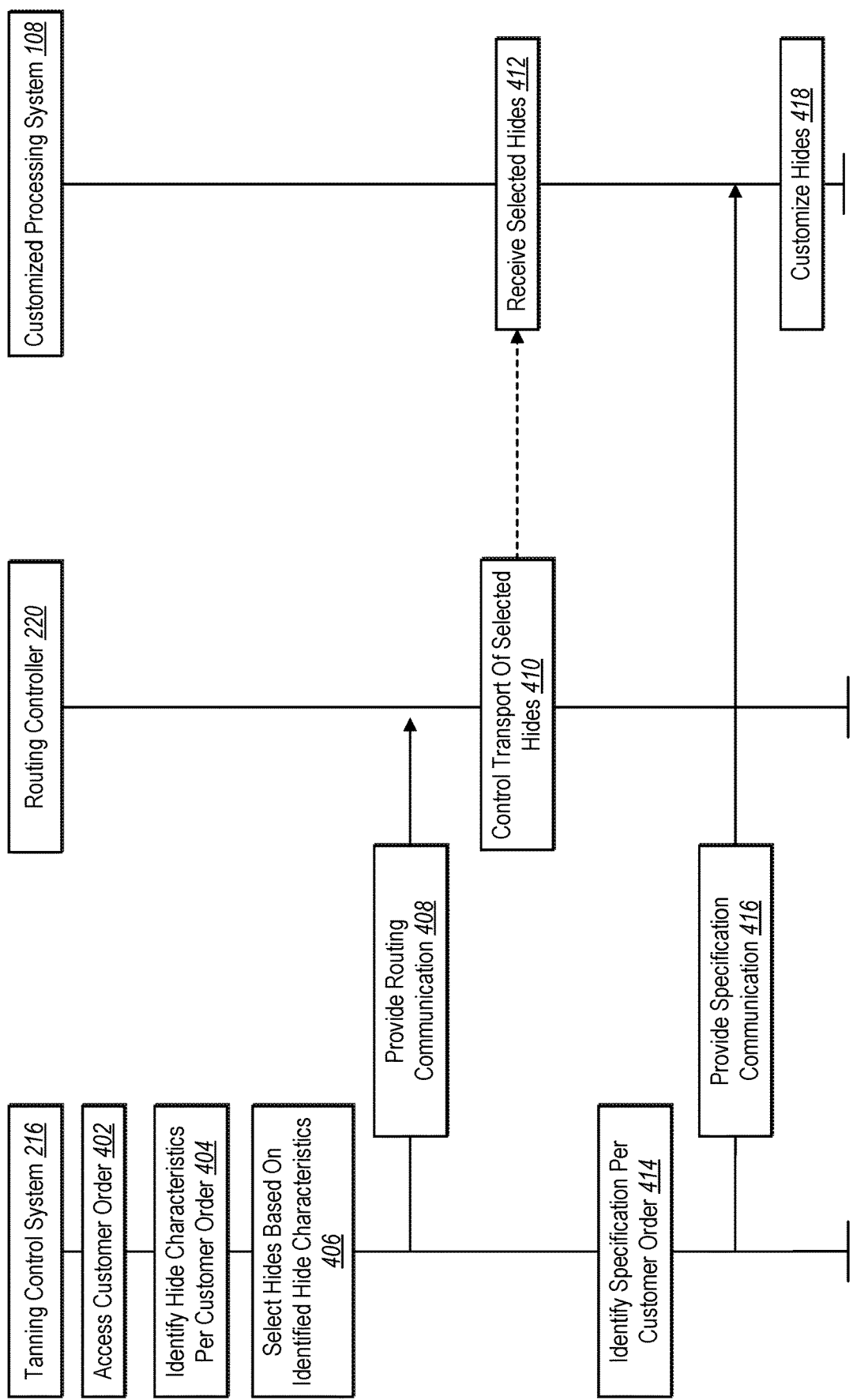
FIG. 4 illustrates a sequence-flow diagram of interactions between a tanning control system, a routing controller, and a customized processing system of FIG. 2 in accordance with one or more embodiments.

Referring now to FIG. 4, which illustrates a sequence-flow diagram of interactions between the tanning control system 216, the routing controller 220, and the customized processing system 108 of FIG. 2. In particular, FIG. 4 illustrates that in one or more embodiments the tanning control system 216 controls and/or communicates with routing controller 220 and customized processing system 108 (e.g., customization controller 218) to transport and customize hides according to particular customer orders.

As FIG. 4 illustrates, step 402 includes accessing a customer order. In particular, tanning control system 216 accesses a customer order for hides. For example, customer order manager 302 of tanning control system 216 can access a customer order by receiving the customer order from an e-commerce customer ordering system (e.g., e-commerce customer ordering system 802 of FIG. 8). Alternatively, customer order manager 302 can access a customer order that is received and stored by an e-commerce customer ordering system. Furthermore, step 402 can include identifying the next customer order to be processed according to the prioritization method used by customer order manager 302, as previously discussed. Additionally, step 402 can include generating electronic customer order information associated with the next customer order to be processed. Once access to a customer order is obtained, tanning control system 216 can then begin to fulfill that customer order.

As shown by step 404, tanning control system 216 identifies hide characteristics per the customer order. More specifically, in one or more embodiments, hide characteristic identifier 304 of customer order manager 302 identifies the hide characteristics of the customer order. For example, hide characteristic identifier 304 can identify the hide characteristics of electronic customer order information associated with the customer order. Moreover, step 404 can include parsing the electronic customer order information to identify the hide characteristics indicated by the customer order. In one or more embodiments, after identifying the hide characteristics of a particular customer order, a compatible package of hides to satisfy the customer order can be determined.

Step 406 shows that tanning control system 216 selects hides based on identified hide characteristics. In particular, in one or more embodiments, hide manager 308 selects one or more packages of hides that correspond to the identified hide characteristics. Further, in one or more embodiments, hide analyzer 310 compares the identified hide characteristics to characteristics associated with one or more packages of hides in order to determine the one or more packages of hides that can be used to fulfill the customer order. Additionally, step 406 can include identifying and locating hides that correspond to the identified hide characteristics. More specifically, step 406 can include determining unique package identifiers for one or more packages of hides that correspond to the identified hide characteristics and determining locations of each of the one or more packages of hides based on the determined unique package identifiers. Moreover, step 406 can include determining whether the customer order indicates that the hides should be customized (e.g., determining whether the one or more packages should be routed to customized processing system 108 for customization or, instead, that the one or more packages should be routed to shipping system 214 for delivery to the customer).

As FIG. 4 illustrates in step 408, tanning control system 216 provides a routing communication to routing controller 220. More specifically, in one or more embodiments, routing manager 312 of tanning control system 216 can provide a routing communication to routing controller 220 as previously described above. For example, step 408 can include providing a routing communication that identifies one or more packages (e.g., by unique package identifier), a source location identifier of the one or more packages (e.g., a unique location identifier associated with hide sorting system 106 or staging system 202), and a destination location identifier for the one or more packages (e.g., a unique location identifier associated with customized processing system 108).

As shown by FIG. 4 in step 410, routing controller 220 controls the transport of the selected hides. More specifically, in response to receiving the routing communication in step 408, routing controller 220 controls one or more rail systems and/or conveyor systems to transport the selected hides from a source location to a destination location. For example, in one or more embodiments, step 410 can further include routing controller 220 forwarding the routing communication to one or more rail systems and/or conveyor systems. As another example, step 410 can include generating one or more additional routing communications based on the routing communication received from tanning control system 216 and providing the one or more additional routing communications to one or more rail systems and/or conveyor systems. Moreover, as FIG. 4 illustrates, step 410 can include routing controller 220 controlling the transport of the selected hides to customized processing system 108, as indicated by step 412.

Thus, FIG. 4 shows that step 412 can include receiving the selected hides. In particular, customizing processing system 108 can receive selected hides that correspond to hide characteristics of a customer order. For example, in one or more embodiments, step 412 can include customized processing system 108 receiving the selected hides at one of the subsystems of customized processing system 108 shown in FIG. 2. As a more specific example, step 412 can include loading the selected hides into one or more wetting drums of a wetting system 204 of customized processing system 108.

As further shown by FIG. 4, step 414 can include tanning control system 216 identifying a specification per the customer order. More specifically, in one or more embodiments, specification identifier 306 of customer order manager 302 identifies a specification of the customer order. For example, specification identifier 306 can identify the specification within electronic customer order information associated with the customer order. Furthermore, step 414 can include identifying one or more customizations indicated by the specification of the customer order. Additionally, step 414 can include parsing the electronic customer order information to identify the specification or the customizations.

FIG. 4 also illustrates in step 416 that tanning control system 216 can provide a specification communication to customized processing system 108. In particular, in one or more embodiments, customization manager 314 of tanning control system 216 can provide a specification communication to customization controller 218 of customized processing system 108. For example, customization manager 314 can provide a specification communication that includes indications of one or more customizations to be performed on the hides, as previously described above.

As shown by FIG. 4 in step 418, customized processing system 108 can customize one or more of the selected hides. More specifically, in one or more embodiments, customization controller 218 of customized processing system 108 can control one or more of the subsystems of customized processing system 108 based on the specification communication received from tanning control system 216. Furthermore, step 418 can include customization controller 218 providing, based on the specification communication, one or more additional control signals to the subsystems of customized processing system 108. For example, customization controller 218 may generate one or more subsystem specific control signals based on the specification communication (e.g., one or more control signals specific to moisturizing system 206, one or more control signals specific to trimming system 210, etc.). Thus, as FIG. 4 illustrates, example embodiments can facilitate the customization of hides according to customer orders.

Turning to FIG. 5, exemplary portions 500 of a tanning system database are illustrated in accordance with one or more embodiments. In one or more embodiments, tanning system database includes one or more databases (e.g., relational databases, non-relational databases, XML databases, JSON databases, SQL databases, NoSQL databases, cloud databases, etc.). Further, as illustrated by FIG. 5, a tanning system database can capture, associate, and store information related to custom pallets processed by customized processing system, such as customized processing system 108 of FIG. 2. Moreover, in one or more embodiments, tanning system database can be included in data storage 316 of FIG. 3.

In particular, each column 502-512 shows examples of the types of information that tanning control system 216 can capture, associate, and store with respect to custom pallets of hides shown by each row 514-520. For example, tanning control system 216 can generate and associate a custom pallet identifier 502 with each custom pallet of hides. Further, tanning control system 216 can determine and associate a hide count 504 of each custom pallet of hides by communicating with customized processing system 108 (e.g., via customization controller 218) to count the hides stacked onto each custom pallet. Moreover, tanning control system 216 can determine and associate hide characteristics, such as a hide type 506 and a hide classification (e.g., grade) 508, based on the hide characteristics associated with the hides used to produce the custom pallets of hides (e.g., the hide characteristics of the one or more packages of hides used to produce the custom pallets of hides). Additionally, tanning control system 216 can determine and associate other characteristics of hides used to produce the custom pallets of hides.

Furthermore, as FIG. 5 shows, tanning control system 216 can determine and associate information relating to customizations performed on the hides of the custom pallets, such as moisture level 510 and grain type 512. Examples of other information relating to customizations can include duration of wetting (e.g., time in wetting drums of wetting system 204), amount of wetting chemicals applied, moisturizing pressure (e.g., pressure applied by wringing device of moisturizing system 206), duration of moisturizing (e.g., time processed by wringing device, dryer, or hanger system of moisturizing system 206), moisturizing temperature (e.g., temperature of dryer of moisturizing system 206), hide thickness (e.g., as split by a splitting device of splitting system 208 or as shaved by a shaving device of trimming system 210), hide edge trimming (e.g., indication of how edges of hides were trimmed by trimming system 210), hide shape trimming (e.g., indication of hide shape as cut by trimming system 210), fold type (e.g., indication of manner that hide was folded by folding device of stacking system 212), or stacking type (e.g., indication of manner that hide was stacked by stacking system 212). Accordingly, as shown by FIG. 5, a tanning system database facilitates improved traceability by storing information related to the customization of hides based on customer orders.

FIGS. 1-5, the corresponding text, and the examples provide a number of different systems and devices for processing and/or customizing hides. In addition to the foregoing, embodiments can also be described in terms of flowcharts comprising acts and steps in a method for accomplishing a particular result. For example, FIG. 6, as described in further detail below, illustrates a flowchart of an exemplary method in accordance with one or more embodiments.

Figure 6:
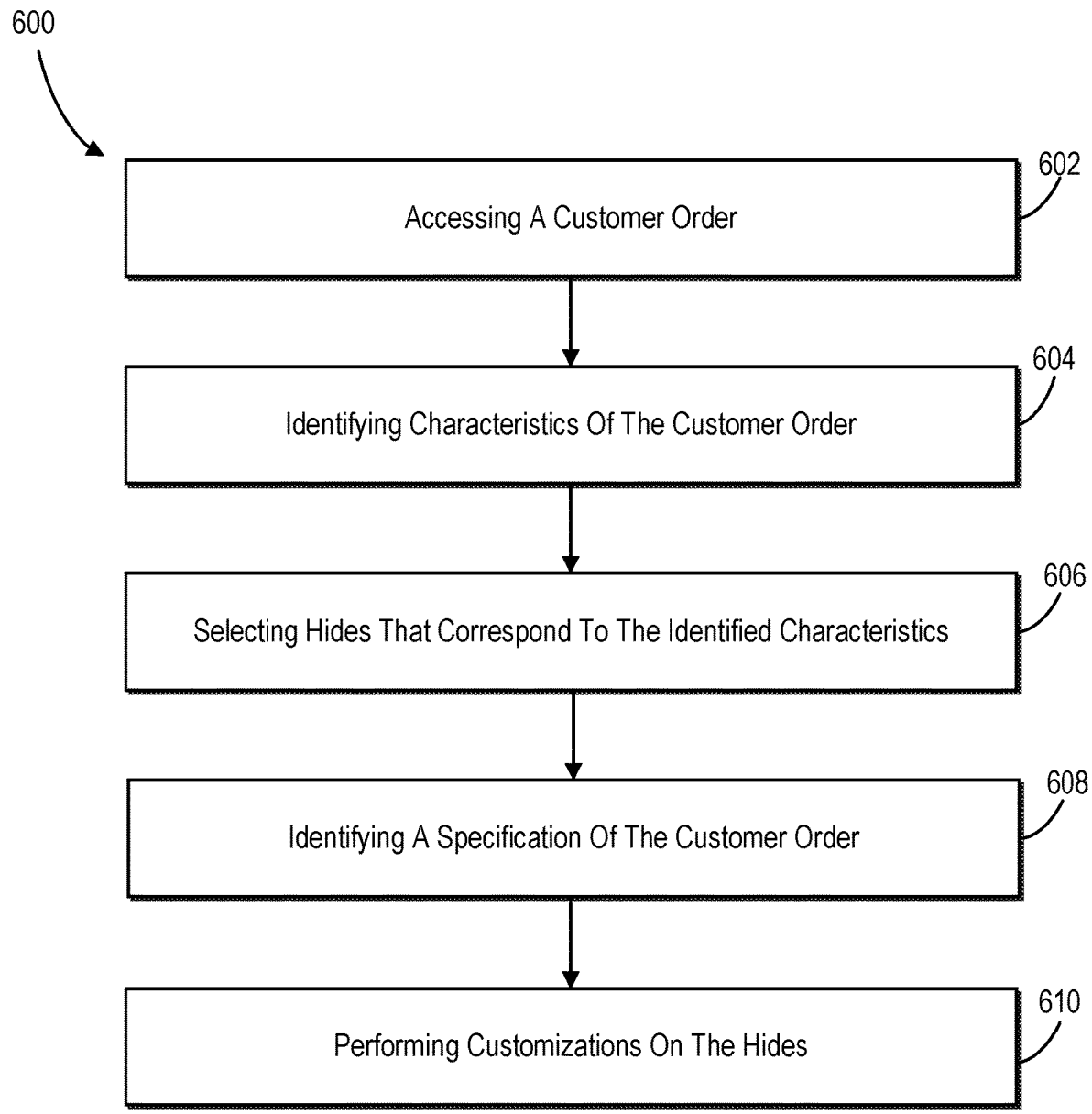
FIG. 6 illustrates a flowchart of a series of acts in a method of customizing hides in accordance with one or more embodiments.

FIG. 6 illustrates a flowchart of one exemplary method 600 of customizing hides from the perspective of a tanning control system 216. The method 600 can include an act 602 of accessing a customer order. More specifically, act 602 can include accessing electronic customer order information associated with a customer order. Further, act 602 can include accessing additional electronic customer order information associated with one or more additional customer orders. Moreover, act 602 can include retrieving a customer order from a database, such as a tanning system database or an e-commerce customer order database. In addition, act 602 can include receiving a customer order from an e-commerce customer ordering system. Additionally or alternatively, act 602 can include accessing a customer order received and stored by an e-commerce customer ordering system.

The method 600 can also include an act 604 of identifying characteristics of the customer order. In particular, act 604 can include identifying one or more hide characteristics within electronic customer order information associated with a customer order. Moreover, act 604 can include identifying a hide count indicated by the electronic customer order information. Furthermore, act 604 can include parsing the electronic customer order information to isolate the characteristics of the customer order. Additionally, act 604 can include identifying a hide grade and/or a hide type indicated by a customer order. Also, act 604 can include identifying a hide weight range and/or a hide surface area range indicated by a customer order.

Furthermore, the method 600 can include an act 606 of selecting hides that correspond to the identified characteristics. More specifically, act 606 can include selecting a group of hides (e.g., one or more packages of hides) that corresponds to one or more hide characteristics of a customer order. Act 606 can also include comparing characteristics associated with a group of hides to hide characteristics of a customer order and determining that the characteristics associated with the group of hides match the hide characteristics of the customer order. Additionally, act 606 can include selecting one or more additional groups of hides that correspond to the one or more hide characteristics of the customer order.

Moreover, act 606 can include determining that a first customer order and a second customer order indicate compatible hide characteristics and determining that a group of hides corresponds to the compatible hide characteristics. Additionally, act 606 can include locating and transporting a group of hides from a first location to a second location. Further, act 606 can include comparing a hide size range of a group of hides to a hide size range indicated by a customer order and determining the hide size range of the group of hides is within the hide size range indicated by the customer order.

The method 600 can also include an act 608 of identifying a specification of the customer order. In particular, act 608 can include identifying a specification within the electronic customer order information associated with the customer order that indicates customizations to perform with respect to one or more hides of a group of hides. Moreover, act 608 can include identifying an additional specification within additional electronic customer order information associated with an additional customer order that indicates customizations to perform with respect to one or more additional hides of the group of hides. Additionally, act 608 can include identifying one or more of a custom moisture level, a custom grain type, a custom trim type, a custom shape, a custom fold type, or a custom stack type indicated by a customer order.

Furthermore, the method 600 can include an act 610 of performing customizations on the hides. More specifically, act 610 can include performing, based on an identified specification, one or more customizations on one or more hides of a group of hides. Act 610 can also include performing, based on an additional specification, additional customizations on one or more additional hides of the group of hides. Moreover, act 610 can include splitting one or more hides of a group of hides in accordance with a custom grain type indicated by a customer order. Additionally, act 610 can include folding one or more hides of a group of hides in accordance with a custom fold type indicated by a customer order.

Act 610 can also include generating a custom package identifier, associating the custom package identifier with a custom package, stacking one or more hides of a group of hides onto the custom package, and marking the custom package with the custom package identifier. Further, act 610 can include identifying a hide identifier of each hide stacked onto the custom package and associating the custom package identifier with the hide identifier of each hide stacked onto the custom package. Moreover, act 610 can include identifying a device identifier of each device used to perform customizations on the hides stacked onto the custom package and associating the custom package identifier with the device identifier of each device. Additionally, act 610 can include verifying that hides were customized according to the customer order.

Embodiments may comprise or use a special purpose or general-purpose computer including computer hardware, such as, for example, one or more processors and system memory, as discussed in greater detail below. Embodiments within the scope also include physical and other computer-readable media for carrying or storing computer-executable instructions and/or data structures. In certain particular embodiments, one or more of the processes described herein may be implemented at least in part as instructions embodied in a non-transitory computer-readable medium and executable by one or more computing devices (e.g., any of the media content access devices described herein). In general, a processor (e.g., a microprocessor, etc.) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, one or more embodiments can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a NIC), and then eventually transferred to computer system RAM and/or to less volatile computer storage media (devices) at a computer system. Thus, it should be understood that non-transitory computer-readable storage media (devices) can be included in computer system components that also (or even primarily) use transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of one or more embodiments. The computer executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the one or more embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. One or more embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service (SaaS), Platform as a Service (PaaS), and Infrastructure as a Service (IaaS). A cloud computing model can also be deployed using different deployment models such as private cloud, community cloud, public cloud, hybrid cloud, and so forth. In this description and in the claims, a "cloud computing environment" is an environment in which cloud computing is employed.

Figure 7:
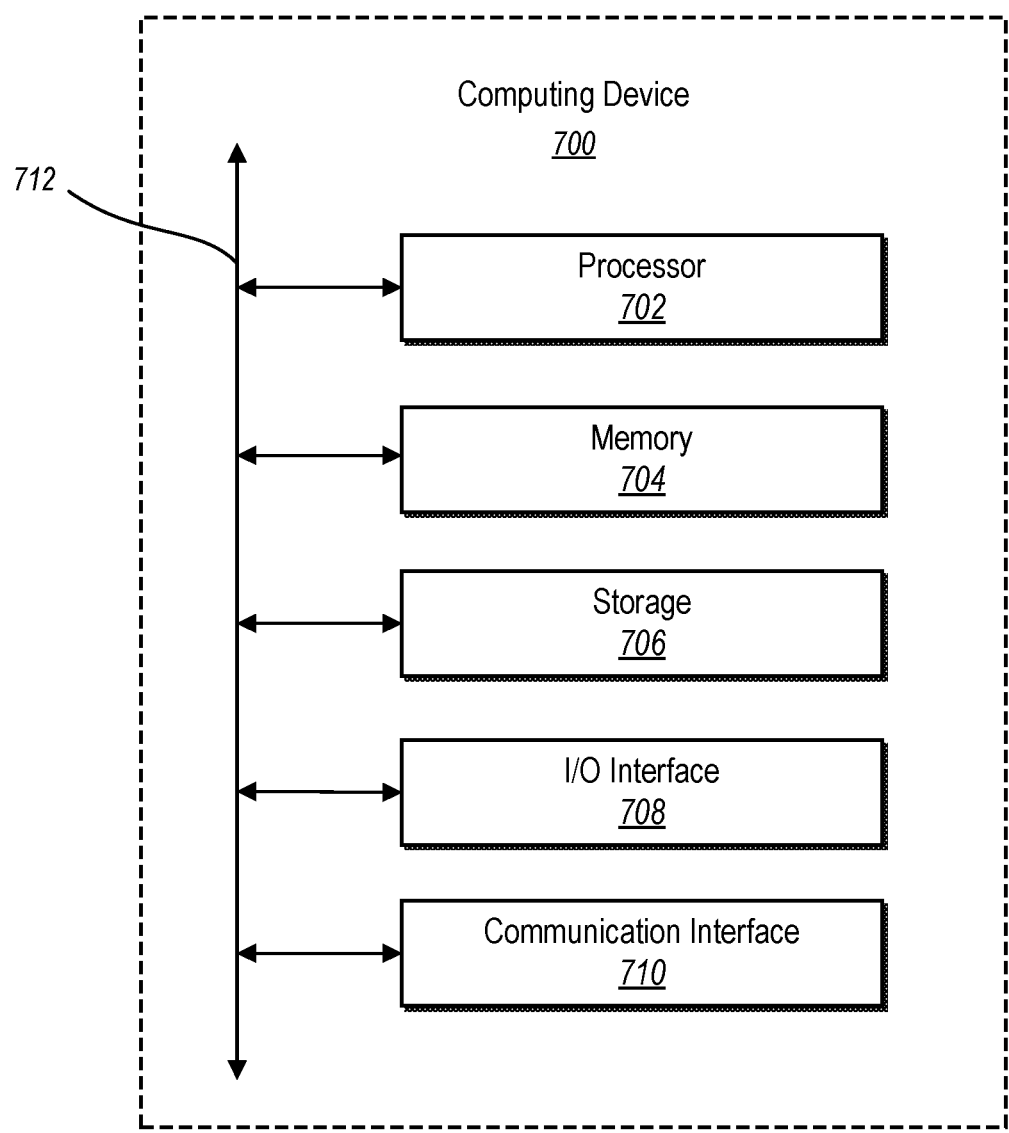
FIG. 7 illustrates a schematic block diagram of an exemplary computing device in accordance with one or more embodiments.

FIG. 7 illustrates, in block diagram form, an exemplary computing device 700 that may be configured to perform one or more of the processes described above. The systems and components 102-112 of FIG. 1 and 202-220 of FIG. 2 can each comprise implementations of the data-computing device 700. As shown by FIG. 7, the computing device can comprise a processor 702, memory 704, a storage device 706, an I/O interface 708, and a communication interface 710. While an exemplary computing device 700 is shown in FIG. 7, the components illustrated in FIG. 7 are not intended to be limiting. Additional or alternative components may be used in other embodiments. Furthermore, in certain embodiments, a computing device 700 can include fewer components than those shown in FIG. 7. Components of computing device 700 shown in FIG. 7 will now be described in additional detail.

In particular embodiments, processor(s) 702 includes hardware for executing instructions, such as those making up a computer program. As an example and not by way of limitation, to execute instructions, processor(s) 702 may retrieve (or fetch) the instructions from an internal register, an internal cache, memory 704, or a storage device 706 and decode and execute them. In particular embodiments, processor(s) 702 may include one or more internal caches for data, instructions, or addresses. As an example and not by way of limitation, processor(s) 702 may include one or more instruction caches, one or more data caches, and one or more translation lookaside buffers (TLBs). Instructions in the instruction caches may be copies of instructions in memory 704 or storage device 706.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory (RAM), Read Only Memory (ROM), a solid state disk (SSD), flash, Phase Change Memory (PCM), or other types of data storage. The memory 704 may be internal or distributed memory.

The computing device 700 includes a storage device 706 for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. Storage device 706 may include removable or non-removable (or fixed) media, where appropriate. Storage device 706 may be internal or external to the computing device 700. In particular embodiments, storage device 706 is non-volatile, solid-state memory. In particular embodiments, storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory, or a combination of two or more of these.

The computing device 700 also includes one or more input or output (I/O) devices/interfaces 708, which are provided to allow a user to provide input to, receive output from, and otherwise transfer data to and from the computing device 700. These I/O devices/interfaces 708 may include a mouse, keypad or a keyboard, a touch screen, camera, optical scanner, network interface, modem, other known I/O devices or a combination of such I/O devices/interfaces 708. The touch screen may be activated with a stylus or a finger.

The I/O devices/interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device 700 and one or more other computing devices or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 710. As an example and not by way of limitation, computing device 700 may communicate with an ad hoc network, a personal area network (PAN), a local area network (LAN), a wide area network (WAN), a metropolitan area network (MAN), or one or more portions of the Internet, or a combination of two or more of these. One or more portions of one or more of these networks may be wired or wireless. As an example, computing device 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 700 may include any suitable communication interface 710 for any of these networks, where appropriate.

The computing device 700 can further include a bus 712. The bus 712 can comprise hardware, software, or both that couples components of computing device 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 8:
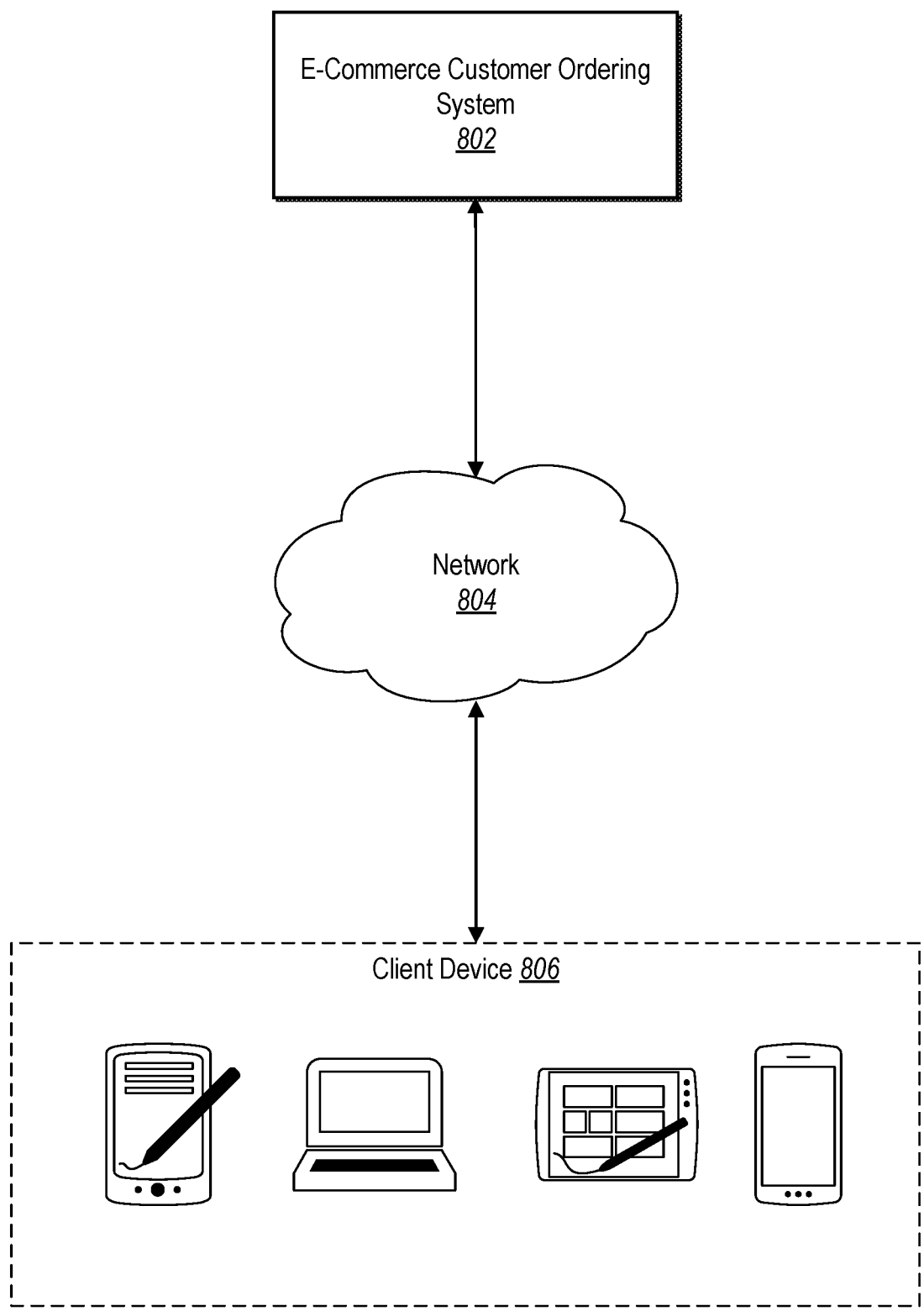
FIG. 8 illustrates an example network environment of an e-commerce customer ordering system in accordance with one or more embodiments.

FIG. 8 illustrates an example network environment 800 of an e-commerce customer ordering system that can communicate with a tanning control system, such as tanning control system 216. Network environment 800 includes a client system 806, and a e-commerce customer ordering system 802 connected to each other by a network 804. Although FIG. 8 illustrates a particular arrangement of client system 806, e-commerce customer ordering system 802, and network 804, this disclosure contemplates any suitable arrangement of client system 806, e-commerce customer ordering system 802, and network 804. As an example and not by way of limitation, two or more of client system 806, and e-commerce customer ordering system 802 may be connected to each other directly, bypassing network 804. As another example, two or more of client system 806 and e-commerce customer ordering system 802 may be physically or logically co-located with each other in whole, or in part. Moreover, although FIG. 8 illustrates a particular number of client systems 806, e-commerce customer ordering systems 802, and networks 804, this disclosure contemplates any suitable number of client systems 806, e-commerce customer ordering systems 802, and networks 804. As an example and not by way of limitation, network environment 800 may include multiple client systems 806, e-commerce customer ordering systems 802, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks.

Links may connect client system 806 and e-commerce customer ordering system 802 to communication network 804 or to each other. This disclosure contemplates any suitable links. In particular embodiments, one or more links include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client system 806 may be an electronic device including hardware, software, or embedded logic components or a combination of two or more such components and capable of carrying out the appropriate functionalities implemented or supported by client system 806. As an example and not by way of limitation, a client system 806 may include any of the computing devices discussed above in relation to FIG. 7. A client system 806 may enable a network user at client system 806 to access network 804. A client system 806 may enable its user to communicate with other users at other client systems 806.

In particular embodiments, client system 806 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 806 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. Client system 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, e-commerce customer ordering system 802 may include a variety of servers, subsystems, programs, modules, logs, and data stores. In particular embodiments, e-commerce customer ordering system 802 may include one or more of the following: a web server, action logger, notification controller, action log, inference module, authorization/privacy server, search module, user-interface module, user-profile store, or connection store. E-commerce customer ordering system 802 may also include suitable components such as network interfaces, security mechanisms, load balancers, failover servers, management-and-network-operations consoles, other suitable components, or any suitable combination thereof.

In particular embodiments, e-commerce customer ordering system 802 may include one or more user-profile stores for storing user profiles (e.g., of customers). A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., customers).

A web server may be used for linking e-commerce customer ordering system 802 to one or more client devices 806 via network 804. The web server may include a mail server or other messaging functionality for receiving and routing messages between e-commerce customer ordering system 802 and one or more client devices 806. A notification controller may provide information to a client device 806. Information may be pushed to a client device 806 as notifications, or information may be pulled from client device 806 responsive to a request received from client device 806. Authorization servers may be used to enforce one or more privacy settings of the users of e-commerce customer ordering system 802. A privacy setting of a user determines how particular information associated with a user can be shared.

In the foregoing specification, various embodiments have been described with reference to specific exemplary embodiments thereof. Various embodiments and aspects are described with reference to details discussed herein, and the accompanying drawings illustrate the various embodiments. The description above and drawings are illustrative and are not to be construed as limiting. Numerous specific details are described to provide a thorough understanding of various embodiments.

One or more embodiments may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method of customizing hides comprising:

accessing, from customer data storage of a tanning control system, electronic information corresponding to a first customer order and electronic information corresponding to a second customer order;

determining, using a customer order manager of the tanning control system, that the first customer order and the second customer order indicate compatible hide characteristics;

determining, using a hide manager of the tanning control system, that a group of hides corresponds to the compatible hide characteristics;

processing, using a customization manager of the tanning control system, a first subgroup of hides of the group of hides in accordance with a first specification indicated by the first customer order by providing a first specification communication to a customization controller of a customized processing system;

processing, using the customization manager of the tanning control system, a second subgroup of hides of the group of hides in accordance with a second specification indicated by the second customer order by providing a second specification communication to the customization controller of the customized processing system; and wherein the customized processing system comprises at least one of the following: a wetting drum, a wringing device, a splitting device, a trimming device, or a folding device.

2. The method of claim 1, further comprising:

identifying, using the customer order manager of the tanning control system, a first hide count indicated by the first customer order;

identifying, using the customer order manager of the tanning control system, a second hide count indicated by the second customer order; and selecting, using the hide manager of the tanning control system, the group of hides based at least in part on a determination that a hide count of the group of hides is greater than or equal to a sum of the first hide count and the second hide count.

3. The method of claim 1, further comprising:

identifying, using the customer order manager of the tanning control system, a first hide type indicated by the first customer order;

identifying, using the customer order manager of the tanning control system, a second hide type indicated by the second customer order; and selecting, using the hide manager of the tanning control system, the group of hides based at least in part on a determination that the first hide type and the second hide type are identical.

4. The method of claim 1, further comprising:

identifying, using the customer order manager of the tanning control system, a first hide grade indicated by the first customer order;

identifying, using the customer order manager of the tanning control system, a second hide grade indicated by the second customer order; and selecting, using the hide manager of the tanning control system, the group of hides based at least in part on a determination that the first hide grade and the second hide grade are identical.

5. The method of claim 1, further comprising:
transporting, using a routing manager of the tanning control system, the group of hides from a first location to a second location; and
folding, using the customized processing system, at least a portion of the group of hides in accordance with the first customer order and the second customer order.

6. The method of claim 5, wherein the first location comprises a hide sorting system and the second location comprises the customized processing system.

7. The method of claim 5, wherein the first location comprises a staging system and the second location comprises the customized processing system.

8. The method of claim 1, further comprising:
generating, using the tanning control system, a first custom pallet identifier and a second custom pallet identifier;
associating, using the tanning control system, the first custom pallet identifier with a first custom pallet and the second custom pallet identifier with a second custom pallet;
stacking, using the customized processing system, the first subgroup of hides onto the first custom pallet and the second subgroup of hides onto the second custom pallet; and
marking, using the customized processing system, the first custom pallet with the first custom pallet identifier and the second custom pallet with the second custom pallet identifier.

9. The method of claim 1, further comprising:
identifying, using the tanning control system, a device identifier of each of one or more devices used to process the first subgroup of hides; and
associating, using the tanning control system, a custom pallet identifier with the device identifier of each of the one or more devices, wherein the custom pallet identifier corresponds to the custom pallet used to store the first subgroup of hides.

10. The method of claim 1, further comprising:
performing, using the customized processing system, one or more first customizations on the first subgroup of hides in accordance with the first specification; and
performing, using the customized processing system, one or more second customizations on the second subgroup of hides in accordance with the second specification.

11. The method of claim 10, wherein the one or more first customizations and the one or more second customizations performed by the customized processing system comprise one or more of:
a custom moisture level;
a custom grain type;
a custom trim type;
a custom shape;
a custom fold type; and
a custom stack type.

12. The method of claim 1, further comprising splitting, using the customized processing system, at least a portion of the group of hides in accordance with the first customer order and the second customer order.

13. A method of customizing hides comprising:
accessing, from customer data storage of a tanning control system, electronic information corresponding to a first customer order and electronic information corresponding to a second customer order;
determining, using a customer order manager of the tanning control system, that the first customer order and the second customer order indicate compatible hide characteristics;
determining, using a hide manager of the tanning control system, that a group of hides located at a first location corresponds to the compatible hide characteristics;
transporting, using a routing manager of the tanning control system, the group of hides from the first location to a second location;
processing, at the second location and using a customization manager of the tanning control system, a first subgroup of hides of the group of hides in accordance with a first specification indicated by the first customer order by providing a first specification communication to a customization controller of a customized processing system;
processing, at the second location and using the customization manager of the tanning control system, a second subgroup of hides of the group of hides in accordance with a second specification indicated by the second customer order by providing a second specification communication to the customization controller of the customized processing system; and
wherein the customized processing system comprises at least one of the following: a wetting drum, a wringing device, a splitting device, a trimming device, or a folding device.

14. The method of claim 13, further comprising comparing, using the hide manager of the tanning control system, characteristics associated with the group of hides to the compatible hide characteristics.

15. The method of claim 14, further comprising:
determining, using the hide manager of the tanning control system, that a hide grade of the group of hides matches a hide grade of the compatible hide characteristics; and
determining, using the hide manager of the tanning control system, that a hide type of the group of hides matches a hide type of the compatible hide characteristics.

16. The method of claim 13, wherein the first location comprises a staging system and the second location comprises the customized processing system.

17. The method of claim 13, wherein the first location comprises a hide sorting system and the second location comprises the customized processing system.

18. The method of claim 13, further comprising performing, at the second location and using the customized processing system, one or more first customizations on the first subgroup of hides in accordance with the first specification.

19. The method of claim 18, further comprising performing, at the second location and using the customized processing system, one or more second customizations on the second subgroup of hides in accordance with the second specification.

20. A customized processing system comprising:
one or more computing devices; and
a non-transitory storage medium comprising instructions that, when executed by the one or more computing devices, cause the system to:
access, from customer data storage of a tanning control system, electronic information corresponding to a first customer order and electronic information corresponding to a second customer order;

determine, using a customer order manager of the tanning control system, that the first customer order and the second customer order indicate compatible hide characteristics;

determine, using a hide manager of the tanning control system, that a group of hides corresponds to the compatible hide characteristics;

process, using a customization manager of the tanning control system, a first subgroup of hides of the group of hides in accordance with a first specification indicated by the first customer order by providing a first specification communication to a customization controller of the customized processing system;

process, using the customization manager of the tanning control system, a second subgroup of hides of the group of hides in accordance with a second specification indicated by the second customer order by providing a second specification communication to the customization controller of the customized processing system; and wherein the customized processing system further comprises at least one of the following: a wetting drum, a wringing device, a splitting device, a trimming device, or a folding device.

* * * * *